United States Patent
Finke et al.

(10) Patent No.: US 8,055,523 B2
(45) Date of Patent: Nov. 8, 2011

(54) SETTING REMINDERS WITHIN PROCESSING OF A BUSINESS DOCUMENT

(75) Inventors: Sabine Finke, Karlsruhe (DE); Ramin Bagheri, Schwetzingen (DE); Martina Rothley, Schwetzingen (DE)

(73) Assignee: SAP AG, Walldorf (DE)

( * ) Notice: Subject to any disclaimer, the term of this patent is extended or adjusted under 35 U.S.C. 154(b) by 1345 days.

(21) Appl. No.: 11/239,156

(22) Filed: Sep. 30, 2005

(65) Prior Publication Data
US 2007/0078694 A1    Apr. 5, 2007

(51) Int. Cl.
*G06Q 10/00*    (2006.01)
(52) U.S. Cl. .................................... 705/7.13
(58) Field of Classification Search ................ 705/7.17
See application file for complete search history.

(56) References Cited

U.S. PATENT DOCUMENTS

| | | | |
|---|---|---|---|
| 5,826,239 A * | 10/1998 | Du et al. | 705/8 |
| 5,918,226 A * | 6/1999 | Tarumi et al. | 1/1 |
| 5,960,406 A * | 9/1999 | Rasansky et al. | 705/9 |
| 6,073,109 A * | 6/2000 | Flores et al. | 705/8 |
| 6,678,698 B2 * | 1/2004 | Fredell et al. | 707/104.1 |
| 7,065,493 B1 * | 6/2006 | Homsi | 705/8 |
| 7,212,987 B2 * | 5/2007 | Swanke et al. | 705/9 |
| 7,284,985 B2 * | 10/2007 | Genevie | 434/235 |
| 7,430,535 B2 * | 9/2008 | Dougherty et al. | 705/38 |
| 7,581,221 B2 * | 8/2009 | Lai et al. | 718/101 |
| 2002/0065701 A1 | 5/2002 | Kim et al. | |
| 2003/0074247 A1 | 4/2003 | Dick et al. | |
| 2004/0181417 A1 * | 9/2004 | Piller et al. | 705/1 |
| 2004/0236753 A1 * | 11/2004 | Porcari et al. | 707/10 |
| 2005/0102154 A1 | 5/2005 | Dodd et al. | |
| 2006/0026166 A1 * | 2/2006 | Sattler et al. | 707/10 |
| 2006/0053035 A1 * | 3/2006 | Eisenberg | 705/2 |
| 2006/0106872 A1 * | 5/2006 | Leban et al. | 707/104.1 |

OTHER PUBLICATIONS

Anonymous, "Logic Software Launches Easy Projects .Net 3.11," GUI Program News, Jun. 1, 2005, vol. 16, Iss 6).*
Boyce, Jim, ("Chapter 20, Scheduling Meetings and Resources," Microsoft Office Outlook 2003 Inside Out, Microsoft Press, Nov. 5, 2003, Print ISBN-10: 0-7356-1514-4).*
eCal Corporation. Selected web pages from developer.ecal.com dated Nov. 2001, downloaded via web.archive.org on Apr 16, 2010.*
eCal Corporation. Selected web pages from ecal.com dated Feb. and Mar. 2005, downloaded via web.archive.org on Apr. 16, 2010.*
PR Newswire. "eCAL Launches New Internet Calendaring Platform," Feb. 23, 1999.*
Michael Hendry and David Rivers. Online Personal Information Managers: The Cure for a Bad "Outlook," www.stcsig.org Newsletter, Oct. 2001 (vol. 8, No. 2).*
E. Panagos and M. Rabinovich. Escalations in workflow management systems. In DART Workshop, Rockville, Maryland, Nov. 1996.*

(Continued)

*Primary Examiner* — Romain Jeanty
*Assistant Examiner* — George H Walker
(74) *Attorney, Agent, or Firm* — Kenyon & Kenyon LLP

(57) ABSTRACT

In a business automation software system, a specifier setting a reminder is added to a business object to provide a arbitrary reminder to the user adding the reminder. Prior to forwarding a business object from a sender to a recipient, a specifier is added to the business object indicating a threshold time limit for a reminder to be sent to the sender. If the threshold time limit specified in the business object is determined to have expired, the reminder is automatically sent to the sender.

20 Claims, 4 Drawing Sheets

OTHER PUBLICATIONS

J. Eder, E. Panagos, M. Rabinovich, Time constraints in workflow systems, in: M. Jarke, A. Oberweis (Eds.), Proceedings of the 11th International Conference on Advanced Information Systems Engineering (CaiSE '99), Lecture Notes in Computer Science, 1626, Springer-Verlag, Berlin, 1999, pp. 286-300.*

Diogo Ferreiraa, João Reia, José M. Mendonçab, and J. J. Pinto Ferreirac. Building a Workflow Enactment Service for Telework Co-Ordination. 2002 downloaded from http://web.tagus.ist.utl.pt/~diogo.ferreira/papers/ferreira99building.pdf, on Dec. 18, 2010.*

SAP. Production Planning & Control Workflow Scenarios. Apr. 2001.*

Andrea Marchetti, Maurizio Tesconi and Salvatore Minutoli. "XFlow: An XML-Based Document-Centric Workflow." Web Information Systems Engineering—WISE 2005, Lecture Notes in Computer Science, 2005, vol. 3806/2005, 290-303, DOI: 10.1007/11581062_22.*

Reinhardt A. Botha, Jan H. P. Eloff, Access Control in Document-centric Workflow Systems—An Agent-based Approach, Computers & Security, vol. 20, Issue 6, Sep. 1, 2001, pp. 525-532, ISSN 0167-4048, DOI: 10.1016/S0167-4048(01)00613-7. (http://www.sciencedirect.com/science/article/pii/S0167404801006137).*

Rupa Krishnan, Lalitha Munaga and Kamalakar Karlapalem. "XDoC-WFMS: A Framework for Document Centric Workflow Management System." Conceptual Modeling for New Information Systems Technologies, Lecture Notes in Computer Science, 2002, vol. 2465/2002, 348-362, DOI: 10.1007/3-540-46140-X_27.*

Edward A. Stohr and J. Leon Zhao. "Workflow Automation: Overview and Research Issues" Information Systems Frontiers, vol. 3, No. 3, Sep. 1, 2001, 281-296, DOI: 10.1023/A:1011457324641.*

"Quality Seal for Xcitec Contract Management (Jan. 2004)" from "Xcitec News, Software for Strategic Purchasing," pp. 1-4. Retrieved from the Internet: <http://www.xcitec.de/web04/en/company/en_news.htm> on Jul. 1, 2005.

"The Customers' Advocate" from "SAP Info" No. 100 (Nov. 11, 2002), pp. 1-2. Retrieved from the Internet: <http://sapinfo.de/public/en/printout.php4/article/Article-219973dbfaaae6c1c1/en> on Jul. 5, 2005.

* cited by examiner

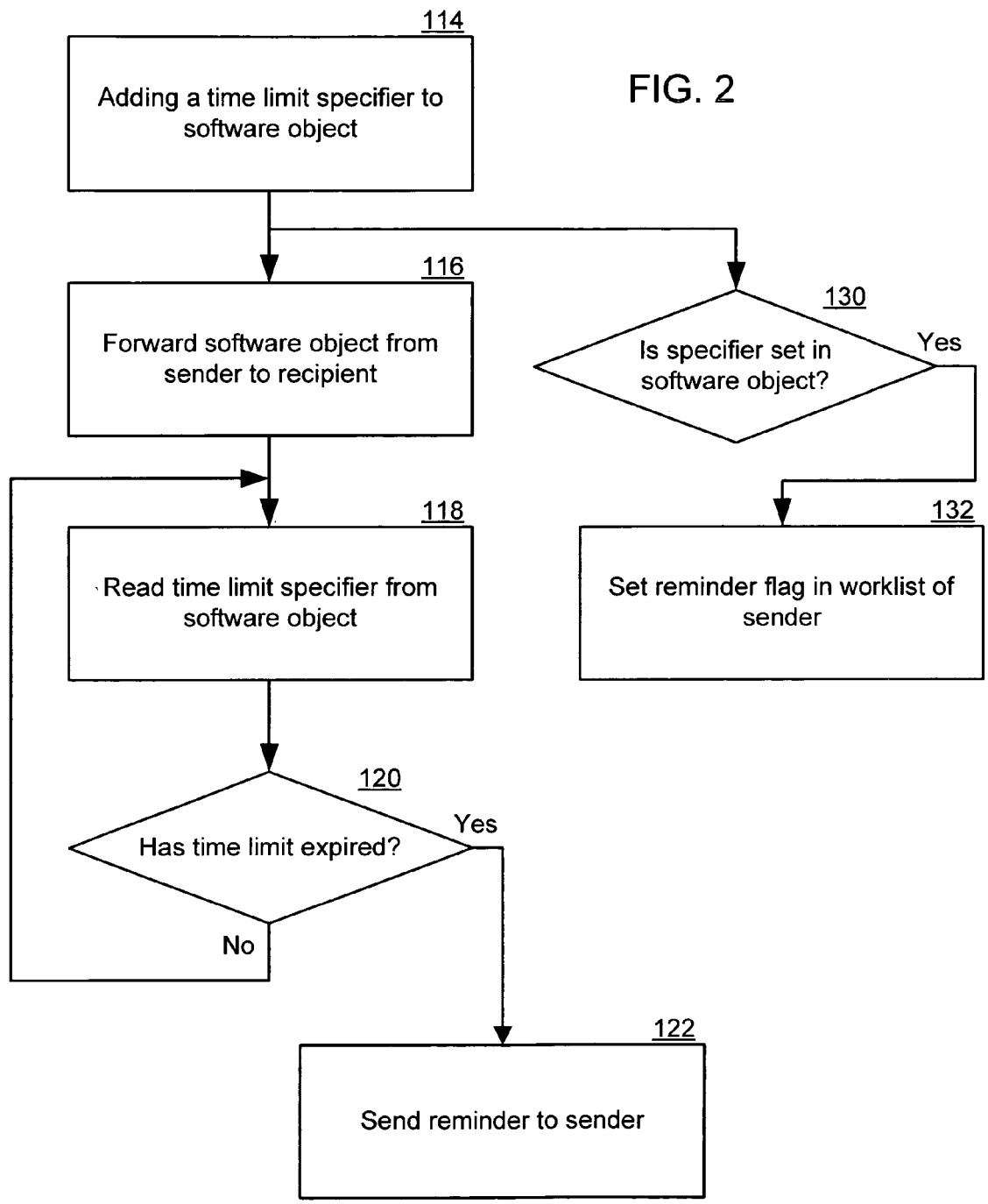

FIG. 3

Worklist for Thursday, March 18, 2004

View by: Day | Print

| Subject | From | Received |
|---|---|---|
| ▼ Past Due | | |
| Order request 4545664: Urgent delivery required | Frank Sanders | 18.03 10:05am |
| Order request 2513003: Invalid source of supply | Pauline Zimmermann | 11.03 9:18am |
| Purchase order 1728003 returned: goods not fully available | Frank Sanders | 13.03 4:56pm |
| Quality of delivered goods for P.O. 2375003 not satisfactory | Frank Sanders | 11.03 5:34pm |
| Delivery quantity of cupric acetate not sufficient | Doris Turner | 11.03 10:34pm |
| ▼ Due Today | | |
| You have no work items past due | | |
| ▶ Incoming Alerts (5) | | |
| Please take over meeting of G.ene with supplier AWS between 11-12 | Iris Smith | 18.03 7:15am |
| Contract with IronCast will expire in one month - renegotiate contract | System | 25.02 7:00pm |
| Your leave request has been approved | Mark Johnson | 18.03 7:12am |
| ▶ Incoming Purchase Requests (39) | | |
| ▶ Open Invoices (8) | | |
| ▶ Due Tomorrow | | |

© Copyright 2005 SAP

SETTING REMINDERS WITHIN PROCESSING OF A BUSINESS DOCUMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Collaboration systems integrate work on one or more projects by several concurrent users at separate workstations. Examples of collaboration systems include groupware products such as Microsoft® Outlook® and Lotus® Notes®, which among other things, handle e-mail, tasks, and scheduling. More elaborate collaboration systems such as SAP® Business One supplement groupware with integrated management capabilities, such as financial management, customer relationship management, and sales management capabilities that provide access to real-time information.

Existing collaboration systems support a variety of business processes. An example of a business process supported on some collaboration systems is a workflow. A workflow routes tasks to groups of users, rather than a single individual. Workflows automate business processes by integrating tasks across departments, applications, and system boundaries. A workflow maps individual tasks needed to complete the workflow to users/groups, automatically informing users/groups of user of their role in the workflow and providing them with whatever information is required for the task. Steps which do not require user intervention may be carried out automatically.

Collaboration systems include subroutines to process user responses, and may include scheduling escalation procedures (e.g., adjust due dates; send reminders to a recipient to take action; reassign tasks) to assure that the workflow is completed in a timely manner. The workflow process creates a precise audit trail and can provide powerful analysis reporting to allow future optimization of the process.

A basic concept behind workflows is the idea of the "business scenarios" in which particular events or activities are anticipated to occur during the normal course of business. When a process needed to support such events/activities can be mapped out into a series of discrete, assignable tasks, a workflow can be created to support the process. An example of a business scenario in the banking context would be the handling of a loan request. Based on conventional business practice, a series of steps and particular information is needed in order to evaluate the request. These steps, who should complete them, and what information is needed can be mapped into a workflow, allowing the collaboration system to guide the loan request from receipt to decision with minimal human intervention.

The information-core of a workflow is a business object. A business object is a software abstraction that represents an entity in the real business world. For example, a business object can represent a business transactions such as a purchase order, a contract, a policy, or a loan. Each business object has elements that can be modeled to capture business data.

The inner structure of a business object is ordinarily concealed from a user. A business object may comprise persistent data (e.g., data tied to a database) and embedded business logic. The business logic is composed of machine-executable instructions which govern the behavior and properties of the object, including how the data is organized for presentation and the inter-relationship of data. Properties of the object may represent the attributes of the entity in the real business world, providing business "meaning" behind object data. For example, a Sales Order object can have properties like order number, order date, and quantity. The business logic may also include machine-executable instructions for performing specific operations such as the manipulation and validation of data. For example, the Sales Order object can include an embedded method to calculate and get the line-items total.

Many business software application users (e.g., purchasers) manage a large quantity of business documents. In many cases documents must be processed and completed step-by-step or must be postponed for some clarification, but completed on-time. This requires that the responsible person keep track of their work, and not forget to continue with documents that require revisiting for clarification.

Existing collaboration system solutions include setting a reminder for a document/workflow task recipient, either via a subroutine in the collaboration system, or via a groupware tool such as setting a task or calendar reminder in Microsoft Outlook. However, absent setting up a groupware task or calendar reminder, current solutions lack any provision for reminding the sender responsible for initiating (or forwarding the business object as a step in) the workflow.

BRIEF DESCRIPTION OF THE DRAWINGS

FIG. 2 supplements the method in FIG. 1 with additional steps.

FIG. 3 is an example of a worklist including reminder functionality based upon the business object.

DETAILED DESCRIPTION

In a business automation software system, a specifier setting a reminder is added to a business object to provide an arbitrary reminder to the user adding the reminder.

Figure 1:
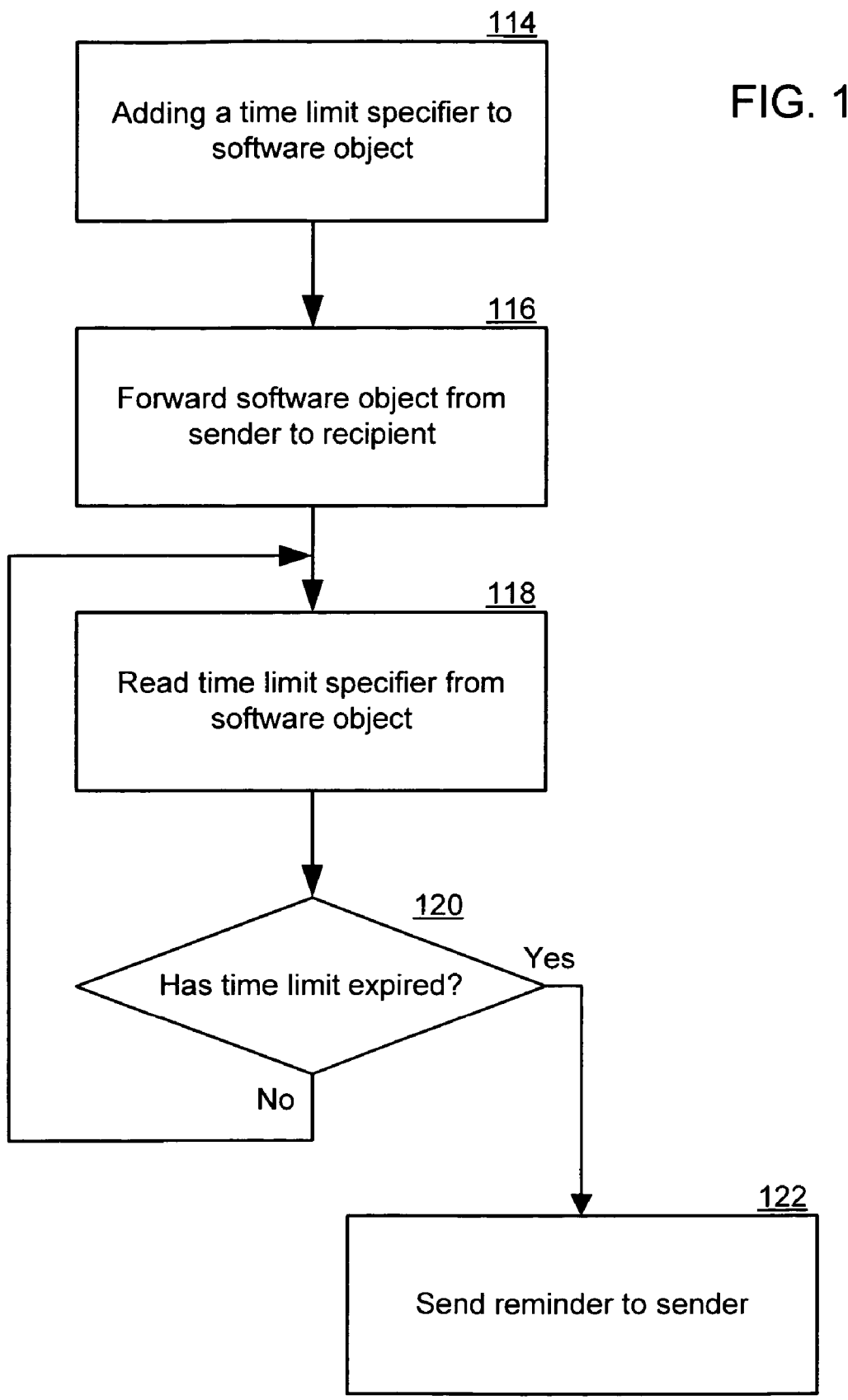
FIG. 1 illustrates a method of processing a reminder by adding a time limit specifier for the reminder to a business object.

Referring to FIG. 1, a user adds (114) a time limit specifier to the business object itself. This time limit specifier may be a date and/or time, or may be a duration of time (e.g., 2 day; 3 months). The adding of the time limit specifier may be as simple as adding numerical data in a field (which may be hidden) of the business object, or may include embedding the complete business logic specifying when, where, and how the reminder is to be sent, together with a description of content for the reminder.

Any number of ways may be included to enable the user to add the time limit specifier. For example, a button or menu item may be included in the business collaboration software interface offering the user the option to add a reminder to an opened or selected business object.

After the reminder is added (114), the user or the collaboration software may forward (116) the business object to a recipient, such as if the business object is part of a workflow. The reminder, incorporated in the object, may not be visible (or even accessible) to the next user. Moreover, the next user may add an additional reminder (114) for themselves before forwarding the object, such that a business object may include plural arbitrary personal reminders. In each case, this reminder functionality is independent for each user, and is independent of any other reminders conventionally provided within workflows, such as automatic deadline reminders.

The time limit specifier is read from the business object (118), and a determination is made (120) as to whether the time limit has expired. There are several ways this may be performed. For example, an application program on a backend system (e.g., reminder manager 480 on application server 460 in FIG. 6) can queue the reminder each time a business object that has been instantiated for a user is checked-in (e.g., saved). Another approach is to have the application program (480) periodically poll business objects checking for reminders. Yet another approach is to have any system instantiating an occurrence of the business object determine whether a reminder is required, and if so, send the reminder; however, waiting for the object to be instantiated before sending a reminder may result in the reminder not being timely.

The reminder may be, among other things, a text or e-mail message sent to the user, or a pop-up window on a terminal accessed by the user. The reminder may include a link back to the business object, such that the user can instantiate the object from the reminder.

Incorporating reminders into the business object simplifies management and is more robust than earlier solutions using tasks, etc., since there is no need to synchronize reminders across multiple systems or software platforms. In earlier systems, where the reminder was set in groupware on a separate software application from the business collaboration software, changes to a reminder required synchronizing across software platforms. In comparison, including reminder data with the business object maximizes portability, while centralizing housekeeping. For example, if a manager responsible for a business object changes, the workflow may be updated to substitute the new manager, and the reminder specifier in the business object may also be update. In this way, the reminder will seamlessly be sent to the new manager rather than the old manager.

Moreover, the ability of a sender/manager to set reminders for themselves assists managers with overseeing progress in a workflow, providing managers the freedom to set arbitrary reminders without unnecessarily burdening recipients. When a large number of workflow documents are currently assigned to a single recipient, the corresponding large number of reminders that the recipient may otherwise receive can reach a point of noise or nuisance, such that the reminders become ineffective. Thus, a manager setting up automatic reminders for the recipient, as is commonly done, may not achieve the desired effect when the recipient is operating at high volume, or is meeting deadlines just-in-time. However, by allowing managers to selectively set up arbitrary reminders for themselves, human intervention into the workflow (e.g., a personal conversation) may be more effective, assisting managers in their role instead of depending upon the computer to serve as a surrogate manager. Likewise, anyone in the workflow chain receiving the business object can leave themselves an independent reminder before forwarding.

Further, the reminder specifier in the business object may be configured not to automatically clear. With existing reminder implementations, if a workflow is, for example, marked "complete," alerts and reminders are not generated. However, as a purpose of the reminder system disclosed herein is to assist manager by allowing the creation of an arbitrary reminder, the reminder may be set to persist without regard to the progress/status of the object. This feature may be set when the reminder is initially set up, or may be included as a software preference referenced when setting up a reminder for a manager. Allowing the user to decide whether the reminder is persistent leaves decision making with regard to the utility of the reminder in the hands of the user, allowing the user to better craft reminders to circumstances and their own working style.

FIG. 2 illustrates an example of additional functionality that may be added to the process from FIG. 1. The user may be part of a worklist group. Any person from a group may pick up an item assigned to the worklist group. For example, work flows may assign business objects to worklist groups instead of individual users. Escalation processes can automatically adjust dates and deadlines. For example, if a worklist item is not picked up or not acted upon, the workflow handler (470 in FIG. 4) or other component of the collaboration system may automatically move the worklist item to another destination, adjust the dates and deadlines, and/or send conventional reminders or advisories.

Each user may access their own personal worklist, which may integrate items from all the worklist groups to which they belong. If the user has set up a reminder in a business object (130), a link to the business object may be added to their worklist, together with a flag to indicate that the worklist item is a reminder (132). FIG. 3 illustrates an example worklist 300, including a worklist item (310) that is a reminder with the flag.

Figure 4:
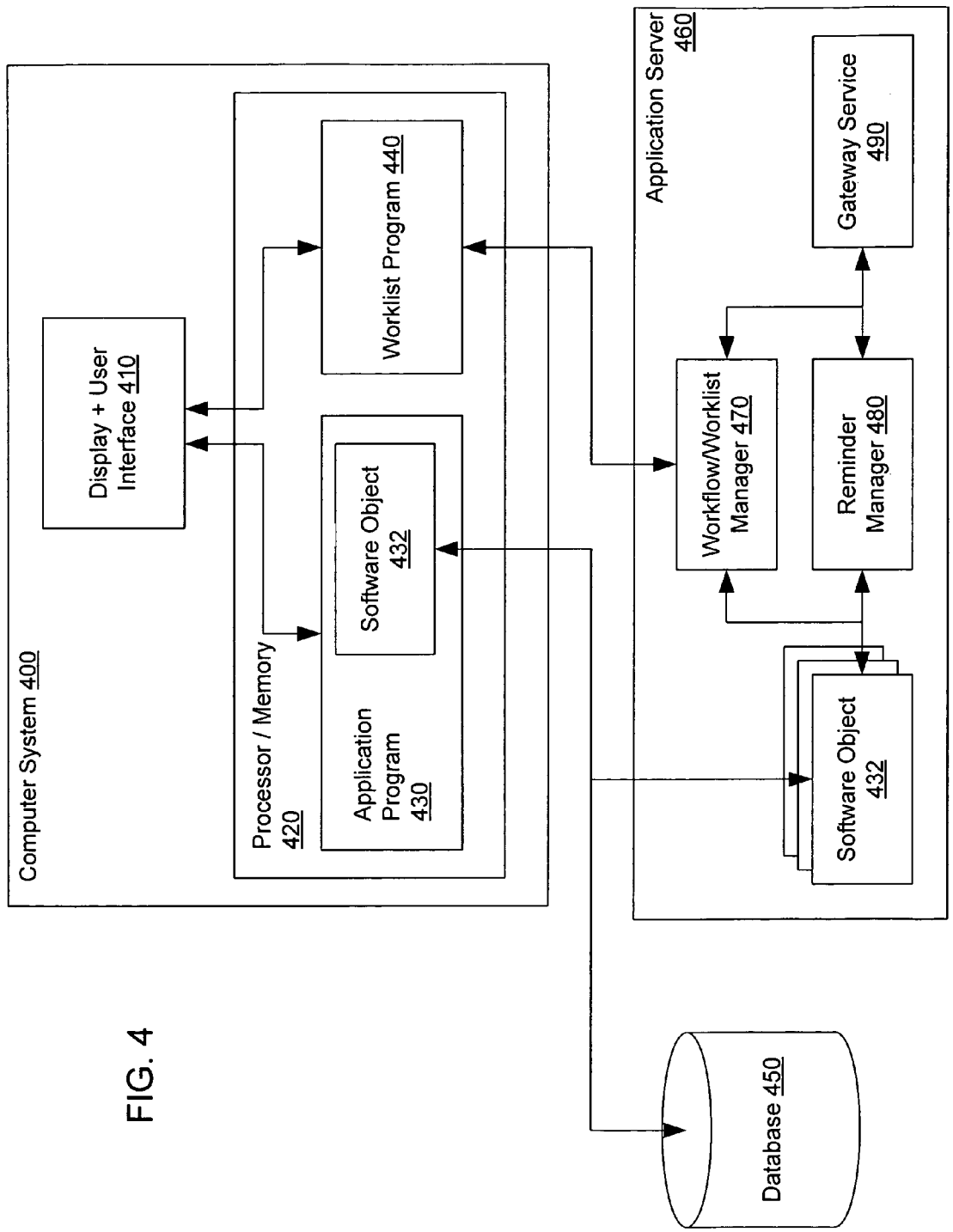
FIG. 4 illustrates a block diagram of a computer system implementing the method of FIGS. 1-2.

FIG. 4 illustrates an example system topology for implementing the above methods. Each of computer system 400 and application server 460 may comprise one or more processors, terminals, and/or computers. Computer system 400 includes a display and user interface 410 and at least one processor 420 with memory. A user, interacting with an business application program 430 via the interface 410, may instantiate a software object 432 on the computer system 400. Likewise, a user may interact with their worklist via the interface 410 using worklist program 440.

Business application program 430 and/or worklist program 440 may be, for example, stand-alone programs resident on the computer system 400, may be plug-ins to other application programs, may be a virtual machine program or script, or may be a mark-up language interface program presented in a web browser. Business application program 430 and worklist program 440 may, of course, be integrated into a same program or package.

Application server 460 comprises a workflow and worklist manager 470, a reminder manager 480, and a gateway service 490. The reminder manager 480 determines that a reminder specifier has been added to a business object 432, as described above. If a reminder has been created, the reminder manager 480 communicates with the workflow/worklist manager 470 to create the worklist item as shown in FIG. 3. Additionally, when a reminder is due by e-mail or text message, the reminder manager 480 sends the reminder via gateway service 490.

One or more business objects may be instantiated on the application server 460 at any give time. For example, if business application program 430 on computer system 400 is a web browser, then the software object 432 instantiated on the computer system 400 may also be instantiated on the application server 460 providing the web interface. The reminder manager 480 may also instantiate the software object 432 if sending out a reminder.

The business object 450 may comprise persistent data tied to a database 450. The application program 430 may extract the data directly from database 450, or may receive the business object 432 from the application server 460. Likewise, application program 430 may store the business object directly to database 450, or to application server 460.

In practice, there may be multiple computer systems (400) in communication with applications server 460 and database 450. Additionally, an occurrence of computer system 400 and application server 460 may be a same system, such that one or more of the application program 430, the worklist program 440, the workflow/worklist manager 470, the reminder manager 480, and the gateway service 490 may co-exist on a same platform.

The methods described above may be stored as instructions on a machine readable medium, that when executed, cause one or more computers to perform the various steps. For example, the computer system 400 and application server 460 may each include a storage component for storing machine-readable instructions for performing the various processes described above and illustrated in FIGS. 1 and 2. The storage component may be any type of machine readable medium (i.e., one capable of being read by a machine) such as hard drive memory, flash memory, floppy disk memory, optically-encoded memory (e.g., a compact disk, DVD-ROM, DVD±R, CD-ROM, CD±R, holographic disk), a thermome-chanical memory (e.g., scanning-probe-based data-storage), other magnetically-coded memory, or any type of machine readable (computer readable) storing medium. The computer system may also include addressable memory (e.g., random access memory, cache memory) to store data and/or sets of instructions that may be included within, or be generated by, the machine-readable instructions when they are executed by the processor.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method comprising:
    assigning, through a processing device, an activity involving a business object to a worklist group according to a workflow, the workflow identifying a sequence of activities involving the business object, the business object is a software object representing a business transaction, the software object including a plurality of elements representing data associated with the business transaction, the worklist group including a plurality of users;
    incorporating a time limit specifier in the business object through the processing device, the time limit specifier including a time limit element and a persistence identifier element;
    reassigning the activity to another entity through the processing device when a user in the worklist group has not picked up the assigned activity before a deadline specified in a deadline element of the business object;
    automatically readjusting the deadline in the deadline element when reassigning the activity;
    when the persistence identifier element is set to persistent, sending an electronic reminder to a manager of the assigned activity through a communications network when the time limit element has lapsed regardless of whether the assigned activity is designated as complete, the manager varying depending on whether the activity has been reassigned; and
    otherwise, when the persistence identifier element is not set to persistent, sending the electronic reminder to the manager of the assigned activity when the time limit element has lapsed and the assigned activity is still designated as incomplete.

2. The method of claim 1, wherein the time limit element is one of a date and a time.

3. The method of claim 1, wherein the time limit element is a duration of time.

4. The method of claim 1, wherein the electronic reminder is sent to the manager independent of any other reminders.

5. The method of claim 1, further comprising inserting a reminder flag in a work list of the manager depending on the time limit specifier together with a link to the business object.

6. The method of claim 1, wherein sending the electronic reminder includes sending a pop-up window alert to a display of a terminal with which a recipient of the electronic reminder is associated.

7. The method of claim 6, wherein the pop-up window alert includes a link to the business object.

8. The method of claim 1, wherein sending the electronic reminder includes sending a text message or e-mail to a recipient of the electronic reminder.

9. The method of claim 8, wherein the text message or e-mail includes a link to the business object.

10. The method of claim 1, wherein the time limit specifier setting the electronic reminder does not automatically clear from the business object.

11. A machine-readable medium storing instructions adapted to be executed by a processor to perform a method comprising:
    assigning, through a processing device, an activity involving a business object to a worklist group according to a workflow, the workflow identifying a sequence of activities involving the business object, the business object is a software object representing a business transaction, the software object including a plurality of elements representing data associated with the business transaction, the worklist group including a plurality of users;
    incorporating a time limit specifier in the business object through the processing device, the time limit specifier including a time limit element and a persistence identifier element;
    reassigning the activity to another entity through the processing device when a user in the worklist group has not picked up the assigned activity before a deadline specified in a deadline element of the business object;
    automatically readjusting the deadline in the deadline element when reassigning the activity;
    when the persistence identifier element is set to persistent, sending an electronic reminder to a manager of the assigned activity through a communications network if the time limit element has lapsed, the manager varying depending on whether the activity has been reassigned; and
    otherwise, when the persistence identifier element is not set to persistent, sending the electronic reminder to the manager of the assigned activity after the time limit element has lapsed and the assigned activity is still designated as incomplete.

12. The machine-readable medium of claim 11, wherein the time limit element is one of a date and a time.

13. The machine-readable medium of claim 11, wherein the time limit element is a duration of time.

14. The machine-readable medium of claim 11, wherein the electronic reminder is sent to the manager independent of any other reminders.

15. The machine-readable medium of claim 11, the method further comprising inserting a reminder flag in a work list of the manager depending on the time limit specifier together with a link to the business object.

16. The machine-readable medium of claim 11, wherein sending the electronic reminder includes sending a pop-up window alert to a display of a terminal with which the recipient of the electronic reminder is associated.

17. The machine-readable medium of claim 16, wherein the pop-up window alert includes a link to the business object.

18. The machine-readable medium of claim 11, wherein sending the electronic reminder includes sending a text message or e-mail to a recipient of the reminder.

19. The machine-readable medium of claim 18, wherein the text message or e-mail includes a link to the business object.

20. The machine-readable medium of claim 11, wherein the time limit specifier setting the electronic reminder does not automatically clear from the software object.

* * * * *